United States Patent [19]

Mischke et al.

[11] Patent Number: 4,889,923

[45] Date of Patent: Dec. 26, 1989

[54] AZO COMPOUNDS CONTAINING CYANO AND VINYL-SULFONE GROUPS, A PROCESS FOR THEIR PREPARATION AND THEIR USE AS DYESTUFFS

[75] Inventors: Peter Mischke, Bad Soden am Taunus; Hans J. Schladetsch, Frankfurt am Main, both of Fed. Rep. of Germany

[73] Assignee: Hoechst Aktiengesellschaft, Frankfurt am Main, Fed. Rep. of Germany

[21] Appl. No.: 133,555

[22] Filed: Dec. 16, 1987

[30] Foreign Application Priority Data

Dec. 19, 1986 [DE] Fed. Rep. of Germany ....... 3643386

[51] Int. Cl.$^4$ .......................... D06P 1/38; D06P 3/10; C09B 29/08; C09B 62/51

[52] U.S. Cl. ......................................... 534/597; 8/532; 8/539; 8/549; 8/922; 534/642; 534/838; 534/843; 534/844; 534/846; 534/885

[58] Field of Search ............... 534/642, 597, 642, 846, 534/885; 8/549

[56] References Cited

FOREIGN PATENT DOCUMENTS 2362683 6/1975 Fed. Rep. of Germany .
3215788 11/1983 Fed. Rep. of Germany .
1561944 3/1980 United Kingdom .

Primary Examiner—A. Lionel Clingman

[57] ABSTRACT

Azo compounds corresponding to the general formula (1)

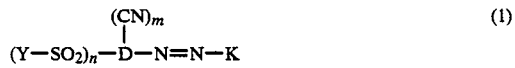

in which
 m represents the number 1 or 2, the cyano groups being attached to D in the ortho-position relative to the azo group,
 n denotes the number 1 or 2,
 Y is the vinyl group or a $\beta$-sulfatoethyl group,
 D denotes a radical of a diazo component of the benzene or naphthalene series which is optionally additionally substituted, but is otherwise free from anionic groups, and
 K denotes a radical of a coupling component which is optionally additionally substituted, but is otherwise free from anionic groups.

The compounds have valuable fiber-reactive dyestuff properties and are suitable for dyeing both hydrophilic and hydrophobic materials, in particular fiber materials, such as, for example, cellulose, wool, synthetic polyamide and polyester.

3 Claims, No Drawings

AZO COMPOUNDS CONTAINING CYANO AND VINYL-SULFONE GROUPS, A PROCESS FOR THEIR PREPARATION AND THEIR USE AS DYESTUFFS

Description

The invention is in the technical field of textile dyestuffs.

The invention relates to new, valuable azo compounds corresponding to a general formula (1)

$$(Y-SO_2)_n-\overset{\overset{\displaystyle (CN)_m}{|}}{D}-N=N-K \quad (1)$$

in which
- m represents the number 1 or 2, the cyano groups being attached to D in the ortho-position relative to the azo group, n denotes the number 1 or 2,
- Y is the vinyl group or a β-sulfatoethyl group,
- D denotes a radical of a diazo component of the benzene or naphthalene series which is optionally additionally substituted, but is otherwise free from anionic groups, and
- K denotes a radical of a coupling component which is optionally additionally substituted, but is otherwise free from anionic groups.

A sulfato group mentioned above or below is a group of the general formula —OSO$_3$M in which
- M denotes a hydrogen atom or an alkali metal, such as sodium, potassium and lithium.

Examples of coupling components are coupling components from the aniline, naphthylamine and naphthol series, preferably from the aniline series.

Examples of substituents in the radicals D and K are halogen, such as fluorine and bromine and especially chlorine, alkyl having 1 to 4 carbon atoms, such as methyl and ethyl, substituted alkyl having 1 to 4 carbon atoms, aryl, alkoxy having 1 to 4 carbon atoms, such as methoxy and ethoxy, nitro, cyano, trifluoroalkyl having 1 to 4 carbon atoms, such as trifluoromethyl, arylsulfonyl, alkylsulfonyl having 1 to 4 carbon atoms, alkanoyloxy having 2 to 5 carbon atoms, aroyloxy, alkanoylamino having 2 to 5 carbon atoms, aroylamino; amino; amino which is monosubstituted or disubstituted by optionally substituted alkyl having 1 to 4 carbon atoms, alkenyl having 2 to 6 carbon atoms, cycloalkyl and/or aryl; carboalkoxy having 2 to 5 carbon atoms; carbamoyl; carbamoyl which is substituted by optionally substituted alkyl having 1 to 4 carbon atoms, cycloalkyl and/or aryl; sulfamoyl and sulfamoyl which is substituted by optionally substituted alkyl having 1 to 4 carbon atoms, cycloalkyl and/or aryl, it being possible for the aryl radicals in the abovementioned substituents also to be substituted by nonionic substituents.

Example of substituted alkyl groups are alkyl groups which are substituted by 1 or 2 substituents belonging to the group comprising chlorine, alkoxy having 1 to 4 carbon atoms, optionally substituted aroylamino, optionally substituted aroyloxy, carboalkoxy having 2 to 5 carbon atoms, alkanoylamino having 2 to 5 carbon atoms, alkanoyloxy having 2 to 5 carbon atoms, hydroxy, cyano and optionally substituted aryl.

Alkenyl groups are preferably groups having 2 to 4 carbon atoms, such as the allyl group, and cycloalkyl groups are preferably groups having 5 to 8 carbon atoms, such as the cyclohexyl group.

Examples of aryl radicals are phenyl and naphthyl radicals; they can be substituted, for example by substituents belonging to the group comprising alkyl having 1 to 4 carbon atoms, such as methyl and ethyl, alkoxy having 1 to 4 carbon atoms, such as methoxy and ethoxy, halogen, such as chlorine and bromine, sulfamoyl, sulfamoyl which is substituted by phenyl, alkyl having 1 to 4 carbon atoms and/or phenylalkyl in which the alkyl radical has 1 to 4 carbon atoms, carbamoyl, carbamoyl which is monosubstituted or disubstituted by phenyl, alkyl having 1 to 4 carbon atoms and/or phenylalkyl in which the alkyl radical has 1 to 4 carbon atoms, cyano and nitro.

Preferred substituents in D are alkyl groups having 1 to 4 carbon atoms, alkoxy groups having 1 to 4 carbon atoms, halogen atoms, such as chlorine atoms, trifluoromethyl and alkylsulfonyl groups having 1 to 4 carbon atoms, and also nitro groups.

Examples of preferred substituents in K are alkyl groups having 1 to 4 carbon atoms, alkoxy groups having 1 to 4 carbon atoms, alkanoylamino groups having 2 to 5 carbon atoms, benzoylamino groups, alkoxyalkoxy groups containing alkyl or alkylene groups each having 1 to 4 carbon atoms, and chlorine and bromine atoms, also amino groups and amino groups which are substituted by alkyl having 1 to 4 carbon atoms, cycloalkyl having 5 to 8 carbon atoms, alkenyl having 2 to 4 carbon atoms and/or phenyl, it being possible for the alkyl radicals in these substituted amino groups also to be substituted in each case by a cyano group, hydroxy group, alkanoyloxy group having 2 to 5 carbon atoms, carboalkoxy group having 2 to 5 carbon atoms or phenyl group.

Azo compounds which can be singled out from the azo compounds according to the invention of the general formula (1) are, in particular, those in which D denotes a benzene or naphthalene radical, preferably a benzene radical, it being possible for D to be substituted not only by one or two cyano groups and one or two groups of the general formula —SO$_2$—Y, but also by substituents belonging to the substituents group comprising alkyl having 1 to 4 carbon atoms, alkoxy having 1 to 4 carbon atoms, halogen, trifluoromethyl, alkylsulfonyl having 1 to 4 carbon atoms and nitro, and K denotes a benzene radical which is substituted, preferably in the para-position relative to the azo group, by an amino group, or by n amino group which is monosubstituted or disubstituted by alkyl having 1 to 4 carbon atoms, cycloalkyl having 5 to 8 carbon atoms, alkenyl having 2 to 4 carbon atoms and/or phenyl, it being possible for the alkyl radicals in these substituted amino groups also to be substituted in each case by a cyano group, hydroxy group, alkanoyloxy group having 2 to 5 carbon atoms, carboalkoxy group having 2 to 5 carbon atoms or phenyl group, and the benzene ring of K can be additionally substituted by substitutents belonging to the substituents group comprising alkyl having 1 to 4 carbon atoms, alkoxy having 1 to 4 carbon atoms, alkanoylamino having 2 to 5 carbon atoms, benzoylamino, alkoxyalkoxy containing alkyl and alkylene having in each case 1 to 4 carbon atoms, chlorine and bromine.

The radical Y in the compounds according to the invention is preferably a β-sulfatoethyl group and furthermore n is preferably the number 1.

Amongst the compounds according to the invention of the general formula (1), those of the general formula (1a) and (1b)

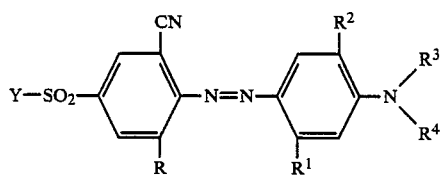

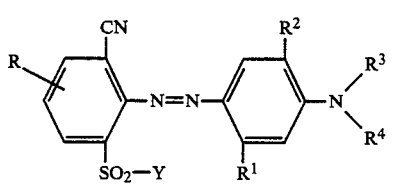

are especially preferred. In these formulae the symbols have the following meanings:

Y has the especially preferred meaning mentioned above;

R is hydrogen, alkyl having 1 to 4 carbon atoms, of which ethyl and especially methyl are preferred, alkoxy having 1 to 4 carbon atoms, of which ethoxy and especially methoxy are preferred, trifluoromethyl, alkylsulfonyl having 1 to 4 carbon atoms, of which ethylsulfonyl and especially methylsulfonyl are preferred, nitro or cyano;

$R^1$ is hydrogen, alkyl having 1 to 4 carbon atoms, of which ethyl and especially methyl are preferred, alkoxy having 1 to 4 carbon atoms, of which ethoxy and especially methoxy are preferred, alkanoylamino having 2 to 5 carbon atoms, of which propionylamino and especially acetylamino are preferred, or benzoylamino; $R^2$ is hydrogen, alkyl having 1 to 4 carbon atoms, of which preferably ethyl and especially methyl, alkoxy having 1 to 4 carbon atoms, of which preferably ethoxy and especially methoxy, alkoxy which has 2 to 4 carbon atoms and is substituted by alkoxy having 1 to 4 carbon atoms, such as β-methoxyethoxy, chlorine or bromine;

$R^3$ is hydrogen, alkyl having 1 to 4 carbon atoms, such as ethyl and methyl, alkyl which has 2 to 4 carbon atoms and is substituted by cyano, hydroxy, carboalkoxy having 2 to 5 carbon atoms, such as carbomethoxy, or alkanoyloxy having 2 to 5 carbon atoms, such as acetoxy, of which preferably β-cyanoethyl, β-hydroxyethyl, β-acetoxyethyl and β-carbomethoxyethyl, or is alkenyl having 2 to 4 carbon atoms, such as allyl; and $R^4$ is hydrogen, alkyl having 1 to 4 carbon atoms, such as ethyl and methyl, alkyl which has 2 to 4 carbon atoms and is substituted by cyano, hydroxy, carboalkoxy having 2 to 5 carbon atoms, such as carbomethoxy, or alkanoyloxy having 2 to 5 carbon atoms, such as acetoxy, of which preferably β-cyanoethyl, β-hydroxyethyl, β-acetyloxyethyl and β-carbomethoxyethyl, or is alkenyl having 2 to 4 carbon atoms, such as allyl, or cyclohexyl, phenyl or benzyl.

Of these, the compounds corresponding to the general formula (1a) are particularly preferred. In the compounds (1b) R is preferably hydrogen, methyl, methoxy, methylsulfonyl or nitro.

In the compounds of the general formulae (1a) and (1b) the formula element $R^3$ is preferably hydrogen, methyl, ethyl, β-cyanoethyl, β-hydroxyethyl and β-acetoxyethyl or ally and the formula element $R^4$ is preferably methyl, ethyl, β-cyanoethyl, β-hydroxyethyl and β-acetoxyethyl.

The new compounds are suitable for dyeing (including printing) hydrophilic and hydrophobic materials, especially fiber materials, such as fiber materials containing hydroxy, carboxamide or ester groups, or mixtures of such fiber materials. They are particularly suitable for dyeing polyester fibers.

Accordingly, the present invention also relates to the use of the compounds of the general formula (1) for dyeing such materials and to processes for dyeing such materials using the compounds (1), by applying the latter to the material from an aqueous medium, and subjecting the material treated in this way to a heat treatment, if appropriate in the presence of an acid-binding agent.

The present invention also relates to a process for the preparation of the azo compounds of the general formula (1), which comprises reacting an azo compound of the general formula (2)

in which Y, m, n, D and K have the meanings mentioned above, but Y is preferably a β-sulfatoethylsulfonyl group, and Hal is a halogen, such as iodine and especially bromine or chlorine, attached to D in the ortho-positions relative to the azo group, in a liquid reaction medium with copper(I) cyanide or a copper cyano complex compound, such as, for example, a compound of the general formula Me[Cu(CN)$_2$] or preferably of the general formula Me$_2$[Cu(CN)$_3$] in which Me represents an alkali metal, such as lithium or potassium or, preferably, sodium, and, if appropriate, in the presence of a catalyst, such as, for example, copper powder.

The reaction of the azo compounds (2) is effected analogously to the process methods and conditions which are customary and known for this type of reaction for replacing halogen atoms by cyano groups; accordingly, the liquid reaction media used are also the solvents or diluents known from the literature for this type of reaction, such as water and polar, protic organic solvents and polar, aprotic organic solvents. Polar, protic solvents are, in particular, mono-($C_1$–$C_4$)-alkyl ethers of ethylene glycol and diethylene glycol, such as glycolmonomethyl ether and diethylene glycol monomethyl ether. Polar, aprotic solvents are, in particular, carboxamides of alkanecarboxylic acids having 1 to 6 carbon atoms, lactams thereof and derivatives thereof which are monoalkylated or dialkylated on the nitrogen by alkyl having 1 to 4 carbon atoms, also dialkyl sulfoxides in which the alkyl radicals have 1 to 4 carbon atoms, trialkyl phosphates in which the alkyl radicals have 1 to 4 carbon atoms, and carboxylic acid nitriles of alkanecarboxylic acids having 2 to 5 carbon atoms; such polar, aprotic solvents are, in particular, N,N-dimethylformamide, N-methyl-2pyrrolidone, dimethyl sulfoxide, triethyl phosphate and acetonitrile.

The reaction temperature is generally between 5 and 150°C., a temperature between 20° and 80°C. being preferred. If water is chosen as the reaction medium, the pH should not exceed the value 7 or, if so, only slightly, since otherwise the β-sulfatoethylsulfonyl group which is considered to be preferred will be converted prematurely into the vinylsulfonyl group. In this case it is advantageous to carry out the reaction at a pH between 5.5 and 7.5, in particular between 6 and 7, especially since copper(I) cyanide forms stable, water-soluble complexes with 2 equivalents of sodium cyanide in this pH range.

It is surprising that the process according to the invention can be carried out successfully, particularly when it takes place in water as the reaction medium, since no damage occurs to the β-sulfatoethylsulfonyl group(s) under the process conditions of halogen/cyano replacement. Deprotonation and subsequent elimination of the sulfato group in the sulfatoethylsulfonyl radical, as is known for the nucleophilic attack by the hydroxyl ion in an alkaline medium on the β-sulfatoethylsulfonyl group, do not take place, as might have been expected, under the influence of the nucleophilic cyanide ion.

Azo compounds according to the invention in which Y is the vinyl group can be prepared in accordance with the invention, and preferably, also by treating a compound of the general formula (1) in which Y is the β-sulfatoethyl group in an aqueous solution with an alkali at a pH between 10 and 11 and at a temperature between 5° and 60° C. for 5 to 15 minutes.

The starting compounds of the general formula (2) can be prepared in a customary manner by customary diazotization and coupling from the diazo and coupling components which are evident or derivable from formula (2), and, in the event that the coupling component radical contains an acylamino or acyloxy group, the acyl radical can also be introduced into an amino group or hydroxy group which is already present by acylation only after the coupling reaction.

Examples of diazo components of starting compounds are 2-bromo-4-(β-sulfatoethylsulfonyl)-aniline, 2,6-dibromo-4-(β-sulfatoethylsulfonyl)-aniline, 2,6-dichloro-4-(β-sulfatoethylsulfonyl)-aniline, 2-bromo-4-nitro-6-(β-sulfatoethylsulfonyl)-aniline 2-bromo-6-nitro-4-(β-sulfatoethylsulfonyl)-aniline and 2-bromo-6-chloro-4-(β-sulfatoethylsulfonyl)-aniline and also other diazo components which are evident from the Examples below.

Examples of radicals of coupling components of starting compounds of the general formula (2) are 2-acetylamino-4-(N,N-dimethylamino)-phenyl, 2-acetylamino-5-methoxy-4-(N,N-dimethylamino)-phenyl and 2-acetylamino-5-methoxy-4-[N,N-bis-(β-acetoxyethyl)amino]-phenyl and other coupling component radicals which are evident from the Examples below.

The corresponding starting compounds (diazo and coupling components) for the compounds of the formula (2) are known or can be prepared analogously to procedures known for these compounds, such as, for example, in accordance with the data of German Patents Nos. 911,733 and 2,653,478.

Both in their vinylsulfonyl form and also, in particular, when used as the β-sulfatoethylsulfonyl compound, the azo compounds according to the invention are suitable for dyeing hydrophilic and hydrophobic materials.

Hydrophilic materials are, in particular, cellulose fiber materials and materials of animal origin containing carboxamide groups, such as wool and hair. Examples of hydrophobic materials, particularly in the form of fibers, are cellulose esters, such as cellulose diacetate, cellulose 2½acetate or cellulose triacetate, also synthetic materials containing carboxamide groups, such as polyurethanes and polyamides, especially as fibers, such as polyamide-6, polyamide-6,6 and polyamide-4, and also polyesters, especially as fibers, such as polyethylene glycol terephthalate in an unmodified or modified state, such as polyethylene glycol terephthalate which has been modified with polyethylene oxide or polypropylene oxide in the form of a block polymer and which affords a fiber material which can be dyed without a carrier at the boil. It is, of course, also possible to employ mixtures of such synthetic fibers with one another or with natural fibers containing hydroxy groups or carboxamide groups, such as cellulose fibers and wool.

Whereas the vinylsulfonyl compounds according to the invention are water-insoluble compounds which, for use in a particularly advantageous manner, must first be subjected to fine distribution by adding customary dispersing agents and which are advantageously employed together with the dispersing agent by the customary procedures of dyeing and printing hydrophobic synthetic materials, in particular fiber materials, preferably from an aqueous liquor—procedures which have been described, in particular, for the use of disperse dyestuffs—the β-sulfatoethylsulfonyl compounds according to the invention can, as water-soluble dyestuffs, advantageously be applied directly and in solution and without any pretreatment to the material to be dyed, such as fiber material, whether it is of a hydrophilic or hydrophobic nature. The tinctorial application of these compounds according to the invention to hydrophilic fiber materials, such as, for example, cellulose and wool, is effected in accordance with the procedures for the application and fixing of fiber-reactive dyestuffs, which are described in great numbers in the specialist literature, and also in German Patent No. 2,653,478 which has already been mentioned. The β-sulfatoethylsulfonyl compound according to the invention is absorbed onto the material, such as fiber material, and forms with it a covalent, chemical, true bond under the dyeing conditions used—preferably in the pH range between 5 and 8 for material containing carboxamide groups and preferably at a pH between 7.5 and 10 for material containing hydroxy groups, it being possible to use in each case dyeing temperatures between 20 and 100° C., or higher if desired.

For dyeing hydrophobic material, such as fiber material, an aqueous solution of the β-sulfatoethylsulfonyl compound according to the invention is also used, and the material is subjected to a heat treatment together with this aqueous solution at a pH between 4 and 8, preferably between 5 and 7.5. The pH can be adjusted and maintained by using acid-binding agents, including buffer mixtures, such as an alkali metal hydroxide or a basic alkali metal salt of carbonic acid or phosphoric acid or of a weak organic acid, or an alkali metal salt which liberates alkali in the heat treatment, such as, for example, trichloroacetate. The dyeing procedure can be such that the aqueous solution of the β-sulfatoethylsulfonyl compound according to the invention, which already contains, in solution, the acid-binding agent and a dyeing auxiliary customary for water-soluble dyestuffs, such as an electrolyte salt, an acid-binding buffer mixture, urea and a thickener, is applied to the material, for example by padding or printing by means of this aqueous dye liquor or by introducing the material to be dyed into the aqueous dye liquor (dyebath). It is also possible, however, to use a procedure in which the aqueous solution of the β-sulfatoethylsulfonyl compound, if appropriate together with dyeing auxiliaries of this kind, is applied to the fiber material without the acid-binding agent, and the acid-binding agent is only added afterwards, for example to the dyebath containing the material to be dyed or by after-padding or after-printing the material using an aqueous solution containing the acid-binding agent. The application of the compound according to the invention is effected, as a rule, at a low temperature, such as, for example, a temperature between 15° and 30° C. The material which has been pretreated in this manner is then subjected to a heat treatment, either in the dye liquor itself or, for example, by means of superheated steam, preferably at temperatures selected between 40° and 220° C., in particular between 60° and 200° C., it being necessary to carry out the process in a closed dyeing machine if a dyebath is used. These dyeing procedures can also be applied to cellulose fiber materials. Under the action of heat and the alkali, the water-soluble compound, according to the invention, containing only one (or several) β-sulfatoethylsulfonyl group(s) as the sole group imparting solubility in water, is converted, with the elimination of the sulfato group, into the vinylsulfonyl compound according to the invention, analogously to the information given in Angewandte Chemie 74, 967 and 968 (1962); because of the elevated temperature prevailing in the dyeing process, this vinylsulfonyl compound is then present still in a dissolved form or in a very finely divided form in the dyebath or on the material, particularly on the fibers and within the fiber material, and becomes fixed on the material.

Acid-binding agents used for these procedures are, as a rule, agents having an alkaline reaction, preferably agents having a weakly alkaline reaction, such as sodium bicarbonate, sodium carbonate, disodium hydrogenphosphate, sodium acetate, sodium borate, a mixture of disodium hydrogenphosphate and sodium dihydrogenphosphate or of sodium acetate and acetic acid, or trichloroacetate as a compound which releases alkali.

A preferred use of the β-sulfatoethylsulfonyl compounds according to the invention relates to the dyeing of polyester fiber materials wherein a β-sulfatoethylsulfonyl compound of the general formula (1) in an aqueous solution is applied to the polyester fiber material together with an acid-binding agent as specified in the above information, and the material is subjected to a heat treatment. The dyeing of the polyester fiber material is carried out equally advantageously in an aqueous dyebath in the presence of an acid-binding agent and, if appropriate, in the presence of dyeing auxiliaries customary for water-soluble dyestuffs, at a temperature between 90° and 140° C., preferably between 95° and 135° C., and at a pH between 4 and 9, preferably between 5 and 7.5. Under these conditions of application, the vinylsulfonyl azo compound according to the invention which is formed becomes fixed by migrating into the surface of the fiber, without the necessity for the presence of a dispersing agent or carrier customary in the application of disperse dyestuffs.

Uniform and excellent matching dyeings are achieved on polyester/wool mixed fabrics, but especially on polyester/ cotton mixed fabrics, by means of the azo compounds according to the invention, for example by printing a mixed fabric of this type with a printing paste which, in addition to the auxiliaries customary in textile printing, contains the azo compound according to the invention in the β-sulfatoethylsulfonyl form and, as the acid-binding agent, sodium bicarbonate, sodium acetate or trichloroacetate, for example. The printed fabric is then dried, and the dyestuff is fixed by subjecting the fabric to a high temperature treatment, such as, for example, 20° to 90° seconds at 190° to 220° C. or 6 to 8 minutes at 160° to 200° C.

Both by the procedures, for fiber-reactive dyestuffs, of dyeing hydrophilic materials, such as fiber materials, and by the procedures, according to the invention, of dyeing hydrophobic materials, the azo compounds according to the invention afford deep dyeings of good fastness properties. Of these, properties which should be singled out are, in particular, the good fastness properties to washing and light for the cellulose fiber materials, the good fastness properties to sublimation, wet processing and light, as well as very good exhaustion of the bath, even with deep color shades, for polyester fiber materials, and, for mixed fabrics, such as, in particular, polyester/cotton mixed fabrics, not only the fastness properties mentioned, but also, in particular, the very good matching dyeing.

The Examples below serve to illustrate the invention. Unless a note is made to the contrary, the parts are parts by weight and the percentages are percentages by weight. The relationship of parts by weight to parts by volume is that of kilograms to liters.

The compounds described by means of formulae in these Examples are shown in the form of free acids; in general they are prepared and isolated in the form of their sodium or potassium salts and are employed for dyeing in the form of their salts. Similarly, the starting compounds and components mentioned in the form of the free acid in the following Examples, including Tabular Examples, can be employed in the synthesis as such or in the form of their salts, preferably alkali metal salts.

The absorption maxima ($\lambda_{max}$ values) were determined at 20° C. in an aqueous solution of the alkali metal salts, unless otherwise indicated.

EXAMPLE 1

18.85 parts of an azo compound synthesized from 2-bromo-4-(β-sulfatoethylsulfonyl)-aniline as the diazo component and 3-diethylaminoacetanilide as the coupling component are dissolved, in the form of the sodium salt, in 100 parts by volume of dimethyl sulfoxide; a solution of 4.5 parts of copper(I) cyanide and 2.5 parts of sodium cyanide in 50 parts by volume of dimethyl sulfoxide is added, and the mixture is then stirred for 18 hours at 20° to 25° C. The reaction mixture is then stirred into 500 parts of water, the solution is clarified with 2 parts of kieselguhr and is filtered, and the azo compound is salted out by adding a concentrated aqueous solution of sodium chloride. The product is filtered off with suction and the residue is washed with half-concentrated aqueous sodium chloride solution and is dried.

27.3 parts of a product containing electrolyte (mainly sodium chloride) and having a 91% content of the alkali metal salt (sodium salt) of the compound of the formula

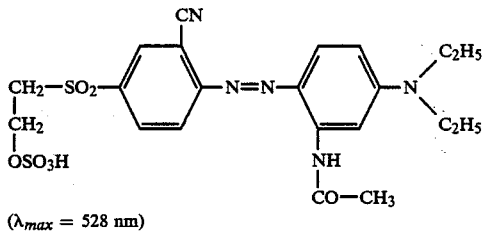

($\lambda_{max}$ = 528 nm)

are obtained. This azo compound according to the invention has valuable dyestuff properties and is suitable, in particular, for dyeing polyester fibers. Thus a polyester material which has been dyed deeply and uniformly in a bluish-tinged red color shade having good fastness properties, such as, in particular, good fastness to sublimation, wet processing and light, is obtained by means of the azo compound by treating 50 parts of a customary polyester fabric with an aqueous dye liquor containing a solution of 0.25 part of this azo compound according to the invention and 3.5 parts of sodium trichloroacetate at 130° C. for one hour in a closed dyeing machine; a very good exhaustion of the bath is obtained in this operation.

EXAMPLE 2

A solution of a sodium copper(I) cyanide complex compound prepared from 150 parts of water, 1.79 parts of copper(I) cyanide and 1.96 parts of sodium cyanide, adjusted, if necessary, to a pH of 6 using a 2N solution of acetic acid, is stirred into a solution, heated to 60° C. and also adjusted to a pH of 6, in 300 parts of water, of 6.56 parts of an azo compound synthesized from 2,6-dibromo-4-($\beta$-sulfatoethylsulfonyl)-aniline as the diazo component and 3-diethylaminoacetanilide as the coupling component. 0.1 part of copper powder is then added, and the mixture is stirred for a further hour at 60° C.; in the course of the reaction the color of the reaction mixture changes from orange to violet (the reaction can be followed readily by thin layer chromatography). When the replacement reaction of the bromine substituent by the cyano substituent is complete, the mixture is filtered and the azo compound according to the invention is salted out by means of 45 parts of sodium chloride, and is filtered off with suction, rinsed with half-concentrated aqueous sodium chloride solution and dried.

6.1 parts of a product containing electrolyte (mainly sodium chloride) and having an 80% content of the alkali metal salt (sodium salt) of the compound of the formula

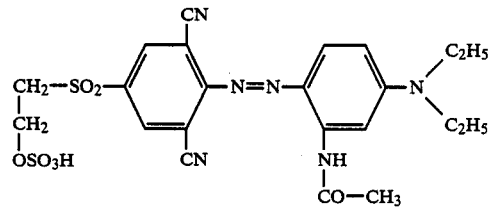

($\lambda_{max}$ = 550 nm)

are obtained. This azo compound according to the invention has valuable dyestuff properties and is particularly suitable for dyeing polyester fibers. Thus a polyester dyeing in a deep and level, reddish-tinged blue color shade having good fastness properties, such as, in particular, good fastness to sublimation, wet processing and light, is obtained by means of the azo compound if 50 parts of a customary polyester fabric are treated with an aqueous liquor containing 0.25 part of this azo compound according to the invention and 3.5 parts of sodium trichloroacetate at 130° C. for one hour in a closed dyeing machine; a very good exhaustion of the bath is obtained in this operation.

EXAMPLES 3 to 31

Further azo compounds according to the invention are described by means of a general formula (A)

$$D^1-N=N-K^1 \qquad (A)$$

in the Tabular Examples below. They can be prepared in the manner according to the invention, analogously to the above illustrative embodiments by reacting a starting compound corresponding to the general formula (B)

$$D^2-N=N-K^1 \qquad (B)$$

with the components $D^2$ and $K^1$ indicated in the particular Tabular Example, by reaction with copper(I) cyanide or a copper cyano complex compound. These azo compounds according to the invention also possess very good dyestuff properties and, using the methods of application indicated in the description, afford on hydrophilic and hydrophobic materials, such as cellulose fiber materials, but especially on polyester fiber materials, deep, fast dyeings having the color shade indicated for the polyester dyeing in the appropriate Tabular Example.

| Example | Radical $D^2$ | Radical $D^1$ | Radical $K^1$ | Color shade |
|---|---|---|---|---|
| 3 | 4-($\beta$-Sulfatoethylsulfonyl)-2-chlorophenyl | 4-($\beta$-Sulfatoethylsulfonyl-2-cyanophenyl | 4-Diethylaminophenyl | red |
| 4 | 4-($\beta$-Sulfatoethylsulfonyl)-2-bromophenyl | 4-($\beta$-Sulfatoethylsulfonyl)-2-cyanophenyl | 4-Diethylaminophenyl | red |
| 5 | 4-($\beta$-Sulfatoethylsulfonyl)-2-chlorophenyl | 4-($\beta$-Sulfatoethylsulfonyl)-2-cyanophenyl | 2-Propionylamino-4-diethylaminophenyl | bluish-tinged red |
| 6 | 4-($\beta$-Sulfatoethylsulfonyl)-2-chlorophenyl | 4-($\beta$-Sulfatoethylsulfonyl)-2-cyanophenyl | 2-Benzoylamino-4-diethylaminophenyl | bluish-tinged red |
| 7 | 4-($\beta$-Sulfatoethylsulfonyl)-2-chlorophenyl | 4-($\beta$-Sulfatoethylsulfonyl)-2-cyanophenyl | 4-N—($\beta$-Cyanoethyl)-aminophenyl | red |
| 8 | 4-($\beta$-Sulfatoethylsulfonyl)-2-chlorophenyl | 4-($\beta$-Sulfatoethylsulfonyl)-2-cyanophenyl | 4-N,N—Di-($\beta$-acetoxyethyl)-aminophenyl | red |
| 9 | 4-($\beta$-Sulfatoethylsulfonyl)-2-chlorophenyl | 4-($\beta$-Sulfatoethylsulfonyl)-2-cyanophenyl | 4-(N—Ethyl-N-allyl)-aminophenyl | red |
| 10 | 2-Bromo-4,6-di-($\beta$-sulfatoethylsulfonyl)-phenyl | 2-Cyano-4,6-di-($\beta$-sulfatoethylsulfonyl)-phenyl | 2-Acetylamino-4-diethyl-aminophenyl | reddish-tinged blue |

-continued

| Example | Radical D² | Radical D¹ | Radical K¹ | Color shade |
|---|---|---|---|---|
| 11 | 2-Bromo-4-(β-sulfato-ethylsulfonyl)-phenyl | 2-Cyano-4-(β-sulfato-ethylsulfonyl)-phenyl | 2-Acetylamino-5-methoxy-4-diethyl-aminophenyl | reddish-tinged blue |
| 12 | 2-Bromo-4-(β-sulfato-ethylsulfonyl)-phenyl | 2-Cyano-4-(β-sulfato-ethylsulfonyl)-phenyl | 4-[N—(β-Cyanoethyl)-N—(β-hydroxyethyl)]-aminophenyl | red |
| 13 | 2-Bromo-4-(β-sulfato-ethylsulfonyl)-phenyl | 2-Cyano-4-(β-sulfato-ethylsulfonyl)-phenyl | 2-Methoxy-4-diethyl-aminophenyl | red |
| 14 | 2-Bromo-4-(β-sulfato-ethylsulfonyl)-phenyl | 2-Cyano-4-(β-sulfato-ethylsulfonyl)-phenyl | 2-Benzoylamino-4-dimethylaminophenyl | red |
| 15 | 2-Bromo-4-(β-sulfato-ethylsulfonyl)-phenyl | 2-Cyano-4-(β-sulfato-ethylsulfonyl)-phenyl | 4-[N—Ethyl-N-(β-acetoxyethyl)]-aminophenyl | red |
| 16 | 2-Bromo-4-(β-sulfato-ethylsulfonyl)-phenyl | 2-Cyano-4-(β-sulfato-ethylsulfonyl)-phenyl | 3-Chloro-4-N—(β-cyanoethyl)-aminophenyl | orange |
| 17 | 2-Bromo-6-nitro-4-(β-sulfatoethylsulfonyl)-phenyl | 2-Cyano-6-nitro-4-(β-sulfatoethylsulfonyl)-phenyl | 2-Acetylamino-4-diethylaminophenyl | reddish-tinged blue (551) |
| 18 | 2-Bromo-6-nitro-4-(β-sulfatoethylsulfonyl)-phenyl | 2-Cyano-6-nitro-4-(β-sulfatoethylsul- | 2-Acetylamino-5-methoxy-4-diethyl-aminophenyl | blue (570) |
| 19 | 2-Bromo-6-nitro-4-(β-sulfatoethylsulfonyl)-phenyl | 2-Cyano-6-nitro-4-(β-sulfatoethylsul- | 2-Acetylamino-5-methoxy-4-N,N—di(β-acetoxyethyl)-aminophenyl | reddish-tinged blue |
| 20 | 2,6-Dibromo-4-(β-sulfatoethylsulfonyl)-phenyl | 2,6-Dicyano-4-(β-sulfatoethylsulfonyl)-phenyl | 4-[N—Ethyl-N—(β-cyanoethyl)]-aminophenyl | violet (540) |
| 21 | 2,6-Dibromo-4-(β-sulfatoethylsulfonyl)-phenyl | 2,6-Dicyano-4-(β-sulfatoethylsulfonyl)-phenyl | 2-Acetylamino-5-methoxy-4-diethylaminophenyl | blue (568) |
| 22 | 2,6-Dibromo-4-(β-sulfatoethylsulfonyl)-phenyl | 2,6-Dicyano-4-(β-sulfatoethylsulfonyl)-phenyl | 2-Acetylamino-5-methoxy-4-N,N—di-(β-acetoxyethyl)-aminophenyl | blue (560) |
| 23 | 2,6-Dibromo-4-(β-sulfatoethylsulfonyl)-phenyl | 2,6-Dicyano-4-(β-sulfatoethylsulfonyl)-phenyl | 2-Methyl-5-methoxy-4-diethyl-aminophenyl | violet (548) |
| 24 | 2-Bromo-4-nitro-6-(β-sulfatoethylsulfonyl)-phenyl | 2-Cyano-4-nitro-6-(β-sulfatoethylsulfonyl)-phenyl | 2-Acetylamino-4-diethylaminophenyl | blue (613) |
| 25 | 2-Bromo-4-nitro-6-(β-sulfatoethylsulfonyl)-phenyl | 2-Cyano-4-nitro-6-(β-sulfatoethylsulfonyl)-phenyl | 2-Acetylamino-5-methoxy-4-diethyl-aminophenyl | greenish-tinged blue (631) |
| 26 | 2-Bromo-4-nitro-6-(β-sulfatoethylsulfonyl)-phenyl | 2-Cyano-4-nitro-6-(β-sulfatoethylsulfonyl)-phenyl | 2-Acetylamino-5-methoxy-4-N,N—di-(β-acetyloxyethyl)-aminophenyl | greenish-tinged blue (627) |
| 27 | 2-Bromo-4-nitro-6-(β-sulfatoethylsulfonyl)-phenyl | 2-Cyano-4-nitro-6-(β-sulfatoethylsulfonyl)-phenyl | 2-Propionylamino-5-(β-methoxyethoxy)-4-ethylaminophenyl | blue (616) |
| 28 | 2,6-Dibromo-4-(β-sulfatoethylsulfonyl)-phenyl | 2,6-Dicyano-4-(β-sulfatoethylsulfonyl)-phenyl | 2-Propionylamino-5-(β-methoxyethoxy)-4-ethylaminophenyl | reddish-tinged blue (550) |
| 29 | 2-Bromo-4-vinylsulfonylphenyl | 2-Cyano-4-vinylsulfonylphenyl | 2-Acetylamino-4-diethylaminophenyl | bluish-tinged red (516) |
| 30 | 2,6-Dibromo-4-vinylsulfonylphenyl | 2,6-Dicyano-4-vinylsulfonylphenyl | 2-Acetylamino-4-diethylaminophenyl | reddish-tinged blue (548) |
| 31 | 2,6-Dibromo-4-vinylsulfonylphenyl | 2,6 Dicyano-4-vinylsulfonylphenyl | 2-Acetylamino-5-methphenyl | blue (606) |

(The absorption maxima of the azo compounds in Examples 29 to 31 were determined in ethyl acetate).

EXAMPLE 32

5 parts of the β-sulfatoethylsulfonyl azo compound, according to the invention, described in Example 1 are dissolved in 200 parts of water at 50° C., and 20 parts by volume of an aqueous 2N sodium hydroxide solution are added, with stirring, at this temperature; stirring is continued for about 5 minutes more at 50° C. and the pH of the solution is then adjusted to a value between 6 and 7 by means of an aqueous 2N solution of acetic acid and the precipitated compound is filtered off with suction, washed with water until free from salts and dried.

3.7 parts of the vinylsulfonyl azo compound, according to the invention, of the formula

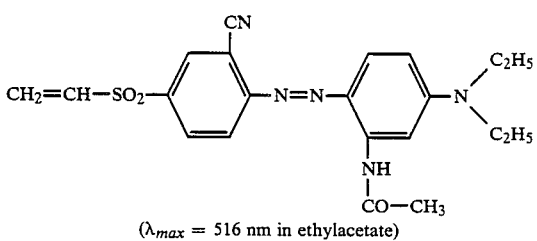

($\lambda_{max}$ = 516 nm in ethylacetate)

are obtained. This azo compound is converted into a finely dispersed form in a customary manner in a glass bead mill using a customary naphthalenesulfonic acid/-formaldehyde condensation product as the dispersing agent; after this treatment, the product affords, from an aqueous liquor in a customary dyeing procedure at 130° C. under pressure, deep and light-fast, bluish-tinged red dyeings on polyester fabric, with high exhaustion of the bath.

EXAMPLES 33 to 35

Further azo compounds according to the invention are described by means of a general formula (A)

$$D^1-N=N-K^1 \qquad (A)$$

in the Tabular Examples which follow. They can be prepared in the manner according to the invention analogously to the above illustration Example 32 from a β-sulfatoethylsulfonyl compound corresponding to the general formula (C)

$$D^3-N=N-K^1 \qquad (C)$$

having the formula radicals indicated in the particular Tabular Example, by reaction with an alkali. These azo compounds according to the invention also possess very good dyestuff properties and, using the methods of application indicated in the description, afford on hydrophilic and hydrophobic materials, such as cellulose fiber materials, but especially on polyester fiber materials, deep, fast dyeings having the color shade indicated for the polyester dyeing in the appropriate Tabular Example (the numerical values given in parentheses represent the absorption maxima in nm; they were determined in ethyl acetate).

| Example | Radical $D^3$ | Radical $D^1$ | Radical $K^1$ | Color shade |
|---|---|---|---|---|
| 33 | 2,6-Dicyano-4-(β-sulfatoethylsulfonyl | 2,6-Dicyano-4-vinyl sulfonylphenyl | 2-Acetylamino-4-diethylaminophenyl | reddish-tinged blue (548) |
| 34 | 2,6-Dicyano-4-(β-sulfatoethylsulfonyl | 2,6-Dicyano-4-vinyl sulfonylphenyl | 2-Acetylamino-5-methoxy-4-diethylaminophenyl | blue |
| 35 | 2,6-Dicyano-4-(β-sulfatoethylsulfonyl | 2,6-Dicyano-4-vinyl sulfonylphenyl | 2-Acetylamino-4-diethylaminophenyl | bluish-tinged red (548) |

APPLICATION EXAMPLE 1

A polyester/cotton mixed fabric (mixing ratio 67:33) is printed with a printing paste composed of 200 parts of a 5% strength aqueous solution of the azo compound, according to the invention, described in Example 1, 400 parts of an aqueous, about 4% strength sodium alginate thickener, 7 parts of sodium nitrobenzenesulfonate, 15 parts of sodium bicarbonate, 50 parts of urea and 328 parts of water. The printed fabric is then dried and is then steamed for 7 minutes with superheated steam at 175° C. in order to fix the compound according to the invention on the material. The fabric is then rinsed with cold water, treated with warm and hot water containing 0.5 g of a detergent based on nonylphenol and ethylene oxide per liter, rinsed again with cold water and dried. A deep, bluish-tinged red dyeing (print) having good fastness to wet processing, sublimation and light is obtained.

APPLICATION EXAMPLE 2

50 parts of a fabric made of polyethylene terephthalate fibers capable of being dyed without a carrier and modified with propylene oxide in the form of a block polymer, are dyed at the boil for one hour in an aqueous liquor containing 2.5 parts of the azo compound, according to the invention, described in Example 18, 3 parts of sodium acetate and 1 part of acetic acid. When the dyeing process is complete, the dyed fabric is first rinsed with water and is then finished by soaping at the boil for 20 minutes in a neutral, aqueous bath. A blue dyeing having excellent fastness to light, wet processing and thermofixing is obtained on the fiber material together with a very good exhaustion of the dyebath.

We claim:

1. An azo compound corresponding to the formula (1b)

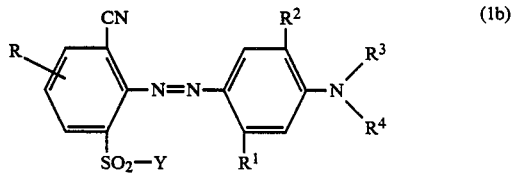

in which

βY is vinyl or β-sulfatoethyl,

R is hydrogen, alkyl having 1 to 4 carbon atoms, alkoxy having 1 to 4 carbon atoms, trifluoromethyl, alkylsulfonyl having 1 to 4 carbon atoms, nitro or cyano, $R^1$ is hydrogen, alkyl having 1 to 4 carbon atoms, alkoxy having 1 to 4 carbon atoms, alkanoylamino having 1 to 4 carbon atoms, alkoxy having 1 to 4 carbon atoms, alkanoylamino having 2 to 5 carbon atoms or benzoylamino, $R^2$ is hydrogen, alkyl having 1 to 4 carbon atoms alkoxy having 1 to 4 carbon atoms, alkoxy which has 2 to 4 carbon atoms and is substituted by alkoxy having 1 to 4 carbon atoms, chlorine or bromine, $R^3$ is hydrogen, alkyl having 1 to 4 carbon atoms, alkyl which has 2 to 4 carbon atoms and is substituted by cyano, hydroxy, carboalkoxy having 2 to 5 carbon atoms or alkanoyloxy having 2 to 5 carbon atoms, or alkenyl having 2 to 4 carbon atoms, and $R^4$ is hydrogen, alkyl having 1 to 4 carbon atoms, alkyl which has 2 to 4 carbon atoms and is substituted by cyano, hydroxy, carboalkoxy having 2 to 5 carbon atoms or alkanoyloxy having 2 to 5 carbon atoms, or alkenyl having 2 to 4 carbon atoms, cyclohexyl, phenyl or benzyl.

2. A compound as claimed in claim 1, wherein Y is a β-sulfatoethyl group.

3. A process for the preparation of an azo compound corresponding to the formula

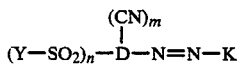

in which m represents the number 1 or 2, the cyano groups being attached to D in the ortho-position relative to the azo group, n denotes the number 1 or 2, Y is a β-sulfatoethyl group, D is a benzene or naphthalene ring which is not additionally substituted or is additionally substituted by at least one substituent selected from the group of substituents consisting of halogen; alkyl having 1 to 4 carbon atoms; substituted alkyl having 1 to 4 carbon atoms; phenyl; naphthyl; alkoxy having 1 to 4 carbon atoms; nitro; cyano; trifluoroalkyl having 1 to 4 carbon atoms; phenylsulfonyl; naphthylsulfonyl; alkylsulfonyl having 1 to 4 carbon atoms; alkanoyloxy having 2 to 5 carbon atoms; phenoyloxy; naphthoyloxy; alkanoyl-amino having 2 to 5 carbon atoms; phenoylaminio; napthoylamino; amino; amino which is substituted by at least one substituent selected from substituted or unsubstituted alkyl having 1 to 4 carbon atoms, alkenyl having 2 to 6 carbon atomsm, cycloalkyl, phenyl, and naphthyl; carboalkoxy having 2 to 5 carbon atoms; carbamoyl; carbamoyl which is substituted by at least one substituent selected from substituted or unsubstituted alkyl having 1 to 4 carbon atoms, cycloalkyl, phenyl, and naphthyl; sulfamoyl; and sulfamoyl which is substituted by at least one substitutent selected from substituted or unsubstituted alkyl having 1 to 4 carbon atoms, cycloalkyl, phenyl, and naphthyl, and is an anilino, aminonaphthyl or hydroxynaphthyl group which is not additionally substituted or is additionally substituted by at least one substituent selected from said group of substituents set forth in the definition of D, which comprises reacting an azo compound of the formula

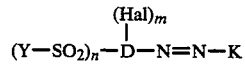

in which Y, m, n, D and K have the above-defined meanings and Hal is a halogen atom attached to D in the ortho-positions relative to the azo group, in a liquid reaction medium with copper (I) cyanide or a copper cyano complex compound, at a temperature between 20 and 80° C., and in the absence or presence of a catalyst.

* * * * *